Jan. 13, 1931. C. J. BURKLEY 1,788,857

ANTISKID CHAIN FOR VEHICLE WHEEL TIRES

Filed Sept. 2, 1927

Inventor
Clement J. Burkley.

By

Attorney

Patented Jan. 13, 1931

1,788,857

UNITED STATES PATENT OFFICE

CLEMENT J. BURKLEY, OF AKRON, OHIO, ASSIGNOR TO THE GOODYEAR TIRE & RUBBER COMPANY, OF AKRON, OHIO, A CORPORATION OF OHIO

ANTISKID CHAIN FOR VEHICLE WHEEL TIRES

Application filed September 2, 1927. Serial No. 217,103.

My invention relates to non-skid chains adapted to be attached to vehicle wheels to prevent skidding thereof upon wet or icy highways, and it has particular reference to means for securing the traction elements or cross chains to the circumferential or side chains of such devices.

The object of my invention is to provide a device of this type which is characterized by greatly increased serviceability due to the elimination of frictional wear at the points where such wear is most pronounced.

Anti-skid chains usually comprise a pair of circumferential or side chains that are adapted to be disposed on each side of a vehicle wheel tire, and a plurality of tractive elements or cross chains that are disposed between the side chains at suitable intervals are permanently connected thereto by means of loops or links which engage certain of the links of the side chains. These elements overlie the tire tread and are designed to insure proper traction of the tire when conditions require their use.

It has been found that at the points of connection between the side chains and the tractive elements, of previously known anti-skid chains, a great deal of frictional wear occurred, due to continuous relative movement of the tractive members and side chains while in use, which in a comparatively short time wore completely through the link in the side chain which forms a part of the connection. This has been a source of great inconvenience and annoyance, and frequent replacement of worn and broken links has been found to be necessary.

My invention provides an effective remedy for this excessive side chain wear by providing means whereby frictional contact between the side chains and the tractive elements is prevented.

The invention is fully described in the following specification and is illustrated in the accompanying drawing, wherein.

Figure 1:
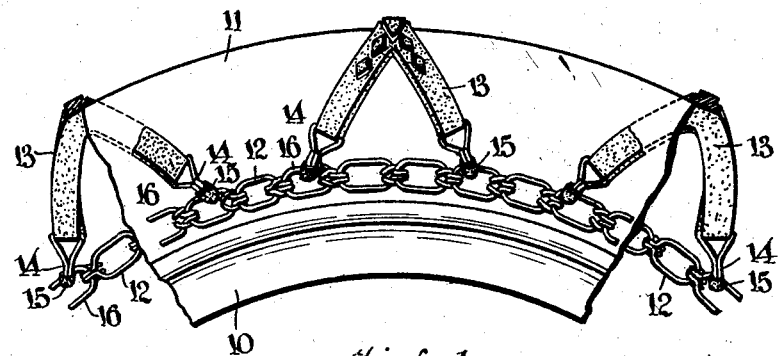
Fig. 1 is a fragmentary side elevational view of a vehicle wheel equipped with an anti-skid chain embodying my invention.
Figure 2:
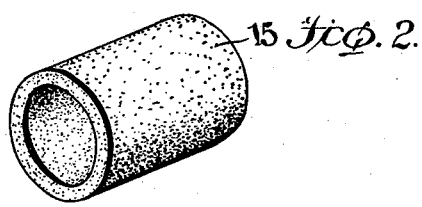
Fig. 2 is a perspective view, on a larger scale, showing in detail one of the bushings that is included in my invention.
Figure 3:
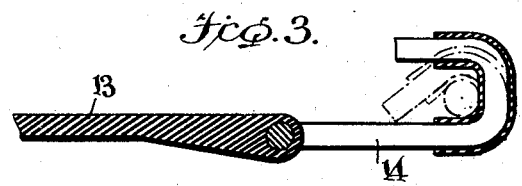
Fig. 3 is a cross-sectional view illustrating a portion of a tractive element embodying the invention.

A better understanding of my invention may be had by reference to the drawings in which is shown a portion of a vehicle wheel 10 carrying a tire 11, upon which is mounted an anti-skid device comprising a pair of side chains 12 and a plurality of tractive elements 13, which are disposed transversely over the tread portion of the tire 11 and between the chains 12. The tractive elements 13 are connected to the side chains by means of hooks 14, which engage links 16 of the chain 12. Before assembling the side chains 12 and cross links 13, each of the hooks 14 is provided with a bushing 15 composed of resilient material, such as rubber. This bushing entirely surrounds the portion of each of the hooks 14 adjacent the links 16 of the side chain 12, when assembled therewith. The tractive elements 13 are then correctly positioned with respect to the side chains and the hooks 14 are closed to form loops, thus permanently connecting them to the side chains.

Figures 4, 5:
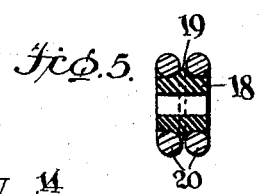
Fig. 4 is a cross-sectional view of a portion of a tractive element having a modified form of bushing associated therewith.
Fig. 5 is a cross-sectional view taken substantially on the line V—V of Fig. 4.
Figure 6:
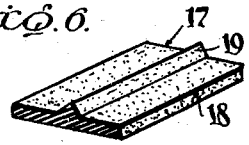
Fig. 6 is a perspective view illustrating in detail a bushing of the form shown in Figs. 4 and 5.

Practically the same advantageous results may be obtained by the employment of a bushing of the form illustrated in Figs. 4, 5 and 6 of the drawings. This bushing 17 comprises a rectangular strip 18 of rubber or similar cushioning material, formed with a longitudinally extending, centrally disposed rib 19. When the bushing 17 is positioned within the hook 14 with the rib 19 disposed between arms 20 of the hook 14 and the ends of the latter are bent around a link 16, ample protection against metal to metal contact of the parts is provided.

It has been found by actual test that a bushing of resilient material, disposed as above described, to prevent metal to metal contact between the side chains and tractive elements, practically obviates side chain wear. The resilient material which forms the bushing is very durable and withstands wear much longer than unprotected metal links. All of the relative movement between the links is absorbed within the bushings which show little or no signs of wear after long service.

It will be readily appreciated that although my invention is of simple nature, it is highly efficient and practical, and results in an article having wear-resisting qualities which are far superior to any similar devices hitherto proposed.

Although I have illustrated but the preferred forms which my invention may assume, and have described those forms in detail, it will be apparent to those skilled in the art that the invention is not so limited, but that various modifications may be made therein without departing from the spirit of the invention or from the scope of the appended claims.

What I claim is:

1. An anti-skid device for vehicle tires comprising a pair of chains adapted to lie one on each side of the tire, tractive elements disposed between the chains and connected thereto, and means for preventing metal to metal contact at the points of connection between the chains and the tractive elements.

2. An anti-skid device for vehicle tires comprising a pair of chains adapted to lie one on each side of the tire, tractive elements disposed between the chains and connected thereto, and resilient means for preventing metal to metal contact at the points of connection between the chains and the tractive elements.

3. An anti-skid device for vehicle wheel tires comprising a pair of chains adapted to lie one on each side of the tire, a plurality of tractive elements disposed between the chains and connected thereto, and elastic bushings carried by the tractive elements for preventing metal to metal contact at the points of their connection to the chains.

4. Anti-skid devices for vehicle wheel tires comprising a pair of chains adapted to lie one on each side of the tire, tractive elements disposed between the chains and connected thereto and rubber bushings mounted upon the tractive elements for preventing metal to metal contact at the points of connection between the chains and the tractive elements.

5. An anti-skid device comprising a tractive element including a side-chain-engaging hook bushed with elastic material.

6. An anti-skid device comprising a tractive element having a side-chain-engaging member including a pair of spaced hooks and an elastic bushing maintained within the hooks.

7. An anti-skid device comprising a tractive element having a side-chain-engaging member including a pair of spaced hooks and an elastic bushing maintained within the hooks by means of an integral ridge on the bushing.

8. An anti-skid device comprising a tractive element having a side-chain-engaging member including a pair of spaced hooks and an elastic bushing maintained within the hooks by means of an integral ridge formed on the bushing and disposed between the hooks.

9. A bushing for a side-chain-engaging member of an anti-skid device comprising a sheet of elastic material having an integral rib extending across the sheet.

10. A bushing for a side-chain-engaging member of an anti-skid device comprising a sheet of elastic material having an integral rib extending across the center of the sheet.

11. A bushing for a side-chain-engaging member including a pair of spaced hooks comprising a sheet of rubber formed with an integral rib for engagement between the hooks to position the sheet.

12. In a non-skid device, side chains, tread members extending therebetween, connecting devices secured to said tread members and connected to said chains, and cover portions of non-metallic material lying between said connecting devices and the side chains.

Signed at Akron, in the county of Summit, and State of Ohio, this 1st day of September, 1927.

CLEMENT J. BURKLEY.